(No Model.)

L. G. ALLEN.
HOLDBACK FOR VEHICLES.

No. 439,368. Patented Oct. 28, 1890.

WITNESSES:
C. L. Bendixon
H. M. Seamans

INVENTOR:
Levi G. Allen
BY
Duell, Laass & Duell
his ATTORNEYS

UNITED STATES PATENT OFFICE.

LEVI G. ALLEN, OF SANDY CREEK, NEW YORK.

HOLDBACK FOR VEHICLES.

SPECIFICATION forming part of Letters Patent No. 439,368, dated October 28, 1890.

Application filed August 16, 1890. Serial No. 362,143. (No model.)

*To all whom it may concern:*

Be it known that I, LEVI G. ALLEN, of Sandy Creek, in the county of Oswego, in the State of New York, have invented new and useful Improvements in Holdbacks for Vehicles, of which the following, taken in connection with the accompanying drawings, is a full, clear, and exact description.

This invention relates to the class of holdbacks which are attached to the thills of the vehicle and adapted to automatically release the holdback-straps in case the horse becomes accidentally unhitched from the whiffletree or the latter is broken, thus liberating the horse from the vehicle without danger of entangling the thills with the harness.

The object of this invention is to provide a vehicle-holdback which shall be simple and inexpensive in construction and convenient, efficient, reliable, and durable in its operation, and at the same time lie so compactly on the thill or shaft as to be nearly concealed from the side and top of the thill; and to that end the invention consists, essentially, in the improved construction and combination of a straight flat bar secured flatwise to the under side of the thill and terminating with a hook in approximately the same plane and extending toward the inner side of the thill, and a spring secured to the inner edge of said bar and lying with its free end normally against the interior of the hook, all as hereinafter more fully described, and specifically set forth in the claim.

Figure 1:
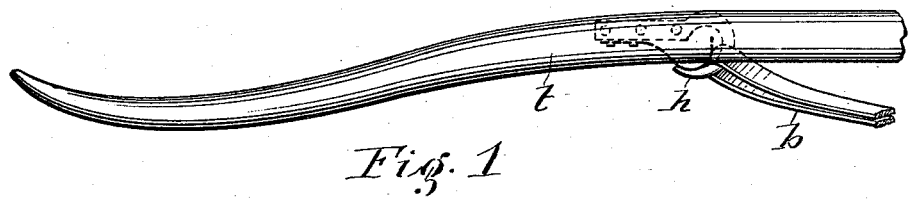
Figure 2:
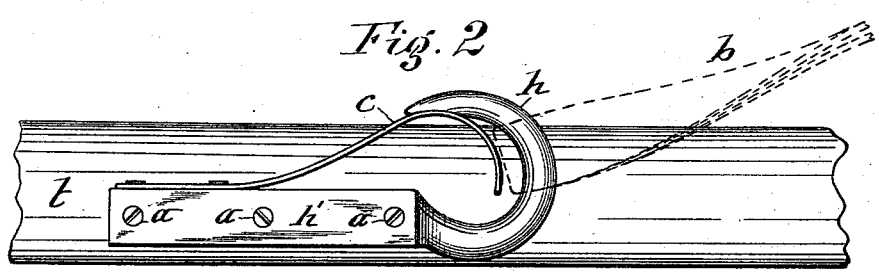
Figure 3:
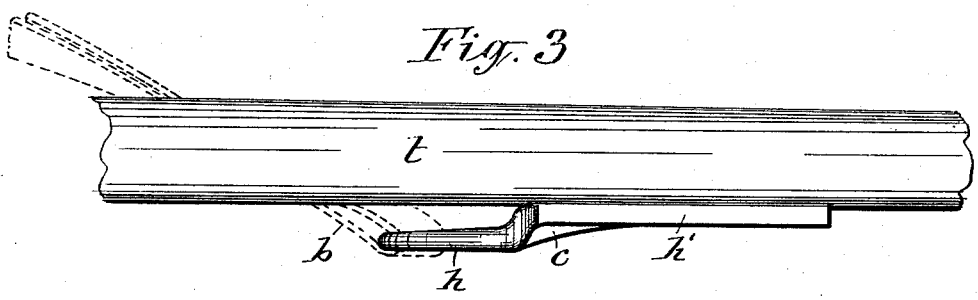

In the annexed drawings, Figure 1 is a top plan view of the front or free end portion of one of the thills provided with my improved holdback, and showing the holdback-strap connected thereto. Fig. 2 is an enlarged inverted plan view of the holdback; and Fig. 3 is a side view of the same.

Similar letters of reference indicate corresponding parts.

$t$ represents that portion of one of the thills to which the holdback is attached. This holdback I form of a straight flat bar $h'$, terminating with a hook $h$ on one end, and in approximately the same plane with the said bar. Said bar is perforated and secured stationary to the under side of the thill by means of screws or rivets $a\ a$, passing through the perforations of the bar and into or through the thill. The hook $h$, being on the rear end of the shank and disposed horizontally and with the free end of the hook toward the inner side of the thill and toward the front or free end thereof, said hook standing sufficiently away from the thill to allow the holdback-strap $b$ to be slipped into the hook.

To the inner edge of the bar $h'$, I attach a spring-guard $c$, consisting of a prolonged leaf-spring, which extends with its free end into the hook $h$, and curved so as to normally bear against the inner side of the free end of the hook and extend across the eye of the hook or toward the fixed end of the hook and thus lie across the front of the holdback-strap $b$, hung on the hook $h$, as illustrated in Fig. 2 of the drawings. The spring-guard $c$ is sufficiently elastic to allow the holdback-strap to be readily slipped into the hook $h$ in hitching the horse. The free end of the spring-guard $c$, which extends across the eye of the hook, is so curved as to allow the strap to enter between said portion of the guard and hook and at the same time allow the guard to spring back into contact with the free end of the hook and thus close the entrance of the hook sufficiently to prevent the holdback-strap when slack from dropping out of the hook. The strap being retained between the hook and guard is thus always in position to allow it to be drawn out from the hook either by hand when unhitching the horse, or by the horse when the traces are accidentally unhitched from the whiffletree.

It will be observed that my improved holdback is so constructed and in such position on the thill as to be nearly concealed, and its construction is simpler and less expensive than other holdbacks of this class.

Having described my invention, what I claim as new, and desire to secure by Letters Patent, is—

The improved concealed holdback, consisting of the straight flat bar $h'$, secured flatwise to the under side of the thill and terminating with the hook $h$ in approximately the same plane and extending toward the inner side of the thill, and the spring $c$, secured to the inner edge of the bar $h'$ and lying with its free end normally against the interior of the hook.

In witness whereof I have hereunto signed my name this 12th day of March, 1890.

LEVI G. ALLEN. [L. S.]

Witnesses:
 J. J. LAASS,
 MARK W. DEWEY.